US009659559B2

(12) United States Patent
Shu

(10) Patent No.: US 9,659,559 B2
(45) Date of Patent: May 23, 2017

(54) PHONETIC DISTANCE MEASUREMENT SYSTEM AND RELATED METHODS

(75) Inventor: Chang-Qing Shu, Orlando, FL (US)

(73) Assignee: ADACEL SYSTEMS, INC., Orlando, FL (US)

( * ) Notice: Subject to any disclaimer, the term of this patent is extended or adjusted under 35 U.S.C. 154(b) by 982 days.

(21) Appl. No.: 12/491,769

(22) Filed: Jun. 25, 2009

(65) Prior Publication Data
US 2010/0332230 A1    Dec. 30, 2010

(51) Int. Cl.
| | | |
|---|---|---|
| G10L 15/01 | (2013.01) | |
| G10L 15/22 | (2006.01) | |
| G10L 15/14 | (2006.01) | |
| G10L 15/187 | (2013.01) | |
| G10L 15/06 | (2013.01) | |
| G06F 17/28 | (2006.01) | |

(52) U.S. Cl.
CPC .............. *G10L 15/01* (2013.01); *G10L 15/22* (2013.01); *G06F 17/2881* (2013.01); *G10L 15/063* (2013.01); *G10L 15/142* (2013.01); *G10L 15/144* (2013.01); *G10L 15/187* (2013.01)

(58) Field of Classification Search
CPC ........ G06F 17/273; G06F 17/27; G06F 17/28; G10L 15/26; G10L 15/063; G10L 15/08; G10L 15/265; G10L 15/187; G10L 15/28; G10L 13/07; G10L 15/01; G10L 15/06; G10L 15/065; G10L 15/10
USPC .................................................. 704/231–257
See application file for complete search history.

(56) References Cited

U.S. PATENT DOCUMENTS

| | | | | |
|---|---|---|---|---|
| 5,579,436 | A * | 11/1996 | Chou et al. .................... | 704/244 |
| 6,032,116 | A * | 2/2000 | Asghar et al. ................ | 704/238 |
| 6,076,057 | A * | 6/2000 | Narayanan et al. ........ | 704/256.2 |
| 6,236,964 | B1 * | 5/2001 | Tamura et al. ............... | 704/254 |
| 6,243,678 | B1 * | 6/2001 | Erhart et al. .................... | 704/249 |
| 6,263,308 | B1 * | 7/2001 | Heckerman et al. .......... | 704/231 |
| 6,304,844 | B1 * | 10/2001 | Pan et al. ....................... | 704/257 |
| 6,456,969 | B1 * | 9/2002 | Beyerlein ...................... | 704/234 |
| 6,529,871 | B1 * | 3/2003 | Kanevsky et al. ............. | 704/246 |
| 6,581,034 | B1 * | 6/2003 | Choi et al. ..................... | 704/238 |
| 6,735,565 | B2 * | 5/2004 | Gschwendtner .............. | 704/254 |
| 6,754,629 | B1 * | 6/2004 | Qi et al. ......................... | 704/246 |
| 7,103,544 | B2 * | 9/2006 | Mahajan et al. .............. | 704/240 |
| 7,117,153 | B2 * | 10/2006 | Mahajan et al. .............. | 704/236 |
| 7,219,056 | B2 * | 5/2007 | Axelrod et al. .............. | 704/235 |

(Continued)

OTHER PUBLICATIONS

P. Mermelstein, "Distance measures for speech recognition, psychologicaland instrumental," in Pattern Recognition and Artificial Intelligence, C. H. Chen, Ed. New York: Academic, 1976, pp. 374-388.*

(Continued)

*Primary Examiner* — Matthew Baker
(74) *Attorney, Agent, or Firm* — Allen Dyer Doppelt & Gilchrist

(57) ABSTRACT

Phonetic distances are empirically measured as a function of speech recognition engine recognition error rates. The error rates are determined by comparing a recognized speech file with a reference file. The phonetic distances can be normalized to earlier measurements. The phonetic distances/error rates can also be used to improve speech recognition engine grammar selection, as an aid in language training and evaluation, and in other applications.

15 Claims, 2 Drawing Sheets

(56) References Cited

U.S. PATENT DOCUMENTS

| | | | |
|---|---|---|---|
| 7,315,818 B2* | 1/2008 | Stevens et al. | 704/235 |
| 7,505,906 B2* | 3/2009 | Lewis et al. | 704/246 |
| 7,590,533 B2* | 9/2009 | Hwang | 704/231 |
| 7,684,986 B2* | 3/2010 | Han et al. | 704/239 |
| 7,783,484 B2* | 8/2010 | Deligne et al. | 704/254 |
| 7,895,039 B2* | 2/2011 | Braho et al. | 704/251 |
| 7,917,363 B2* | 3/2011 | Starkie | 704/251 |
| 8,019,602 B2* | 9/2011 | Yu et al. | 704/231 |
| 8,112,274 B2* | 2/2012 | Beyerlein | 704/234 |
| 8,234,116 B2* | 7/2012 | Liu et al. | 704/256.3 |
| 8,346,548 B2* | 1/2013 | Owen | 704/231 |
| 8,401,852 B2* | 3/2013 | Zweig et al. | 704/251 |
| 2002/0032549 A1* | 3/2002 | Axelrod et al. | 703/2 |
| 2002/0077817 A1* | 6/2002 | Atal | 704/254 |
| 2003/0069729 A1* | 4/2003 | Bickley et al. | 704/236 |
| 2004/0199385 A1* | 10/2004 | Deligne et al. | 704/235 |
| 2004/0254791 A1* | 12/2004 | Coifman et al. | 704/246 |
| 2004/0260543 A1* | 12/2004 | Horowitz et al. | 704/221 |
| 2005/0197838 A1* | 9/2005 | Lin et al. | 704/260 |
| 2005/0203751 A1* | 9/2005 | Stevens et al. | 704/276 |
| 2006/0064177 A1* | 3/2006 | Tian et al. | 700/1 |
| 2006/0106607 A1* | 5/2006 | Atal | 704/254 |
| 2006/0190252 A1* | 8/2006 | Starkie | 704/240 |
| 2006/0282267 A1* | 12/2006 | Lopez-Barquilla et al. | 704/257 |
| 2007/0038449 A1* | 2/2007 | Coifman | 704/243 |
| 2007/0156403 A1* | 7/2007 | Coifman | 704/252 |
| 2007/0179784 A1* | 8/2007 | Thambiratnam et al. | 704/255 |
| 2007/0198265 A1* | 8/2007 | Yao | 704/254 |
| 2008/0126089 A1* | 5/2008 | Printz et al. | 704/235 |
| 2008/0162125 A1* | 7/2008 | Ma et al. | 704/222 |
| 2008/0167872 A1* | 7/2008 | Okimoto et al. | 704/251 |
| 2008/0221896 A1* | 9/2008 | Cai et al. | 704/270.1 |
| 2008/0228485 A1* | 9/2008 | Owen | 704/254 |
| 2008/0243503 A1* | 10/2008 | Soong et al. | 704/244 |
| 2008/0281593 A1* | 11/2008 | Deligne et al. | 704/243 |
| 2008/0294441 A1* | 11/2008 | Saffer | 704/255 |
| 2009/0258333 A1* | 10/2009 | Yu | 434/157 |
| 2010/0217589 A1* | 8/2010 | Gruhn et al. | 704/232 |
| 2010/0228548 A1* | 9/2010 | Liu et al. | 704/251 |
| 2011/0029307 A1* | 2/2011 | Parthasarathy et al. | 704/231 |
| 2011/0093259 A1* | 4/2011 | Saffer | G10L 15/06 704/9 |

OTHER PUBLICATIONS

Audhkhasi, K.; Verma, A.;, "Keyword Search using Modified Minimum Edit Distance Measure," Acoustics, Speech and Signal Processing, 2007. ICASSP 2007. IEEE International Conference on, vol. 4, No., pp. IV-929-IV-932, Apr. 15-20, 2007.*

Schaden, Stefan. uation of Automatically Generated Transcriptions of Non-Native Pronunciations using a Phonetic Distance Measure. in Proceedings of LREC 2006, Genova, Italy, 2006.*

* cited by examiner

PHONETIC DISTANCE MEASUREMENT SYSTEM AND RELATED METHODS

FIELD OF THE INVENTION

The present invention relates to the quantification of acoustic dissimilarity between phonetic elements, and more particularly, to the determination of phonetic distance in the context of speech recognition engines.

BACKGROUND OF THE INVENTION

Conceptually, phonetic "distance" is an attempt to quantify the acoustic dissimilarity between phonetic elements, such as phonemes or words. The phonetic distance between similar sounding phonetic elements is less than the phonetic distance between disparate sounding phonetic elements.

Phonetic distance matrices have been compiled listing the phonetic distance between each pair of phonetic elements within a phonetic element set. For instance, the set can include all the phonemes used in a given spoken language, such as English. The phonetic distance matrix is used as a tool in a variety of applications. For example, the phonetic distance matrix can be used to evaluate the grammar of a speech recognition engine. Grammar paths can be selected with sufficient acoustic separation to minimize recognition errors during subsequent operation of the speech recognition engine.

Currently, phonetic distance is estimated based on knowledge of the physiological mechanisms underlying human pronunciation. Conventionally, the phonetic distances thus estimated are rated on a 0-10 scale.

SUMMARY OF THE INVENTION

In view of the foregoing, it is an object of the present invention to provide an improved system and method for measuring phonetic distances. Another object of the present invention is to provide a system and method for measuring phonetic distances that can take into account the unique characteristics of particular speech recognition engines and/or speakers.

According to an embodiment of the present invention, a phonetic distance measurement system includes a reference file, a recognized speech file, a comparison module configured to determine a plurality of error occurrences by comparing the recognized speech file and the reference file, an error rate module configured to determine a plurality of error rates corresponding to the plurality of error occurrences, and a measurement module configured to determine a plurality of phonetic distances as a function of the plurality of error rates.

According to a method aspect, a method of generating a phonetic distance matrix includes determining a plurality of error occurrences by comparing a recognized speech file with a reference file and determining a plurality of error rates corresponding to the plurality of error occurrences. A plurality of phonetic distances are determined as a function of the plurality of error rates, and a phonetic distance matrix is output based on the plurality of phonetic distances.

According to another aspect of the present invention, the errors for which occurrences and rates are determined by the system and method include substitution, insertion and deletion.

According to a further aspect of the present invention, phonetic distances are normalized to minimize the total separation between the phonetic distance matrix and an existing phonetic distance matrix, for instance, by using a mapping function with three normalization coefficients.

According to additional aspects of the present invention, the error rates and/or phonetic distances determined by the present invention are used in further applications, such as grammar selection for speech recognition engines, and language training and evaluation.

These and other objects, aspects and advantages of the present invention will be better understood in view of the drawings and following detailed description of preferred embodiments.

DETAILED DESCRIPTION OF PREFERRED EMBODIMENTS

Figure 1:
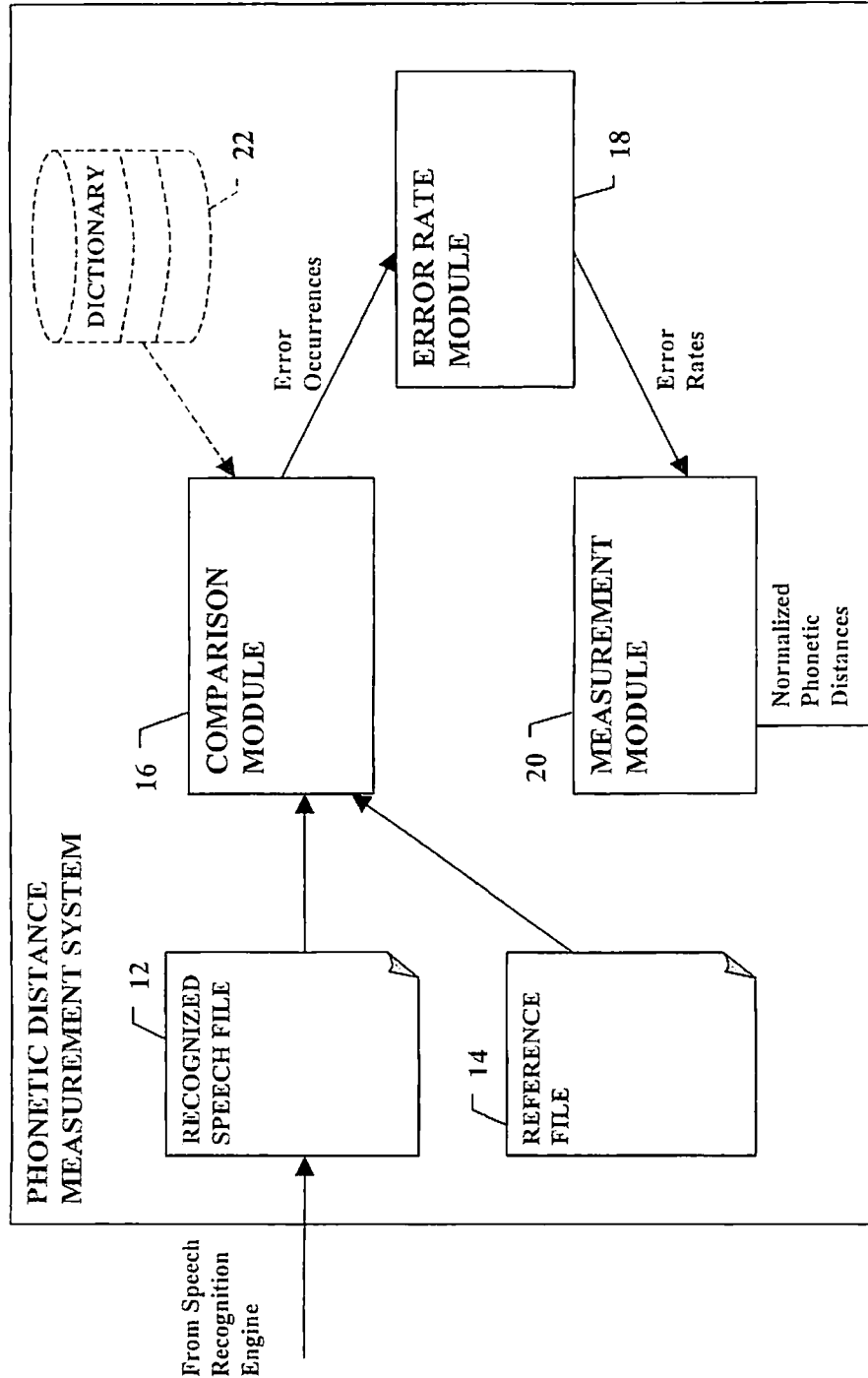
FIG. 1 is a schematic overview of a phonetic distance measurement system, according to an embodiment of the present invention.
Figure 2:
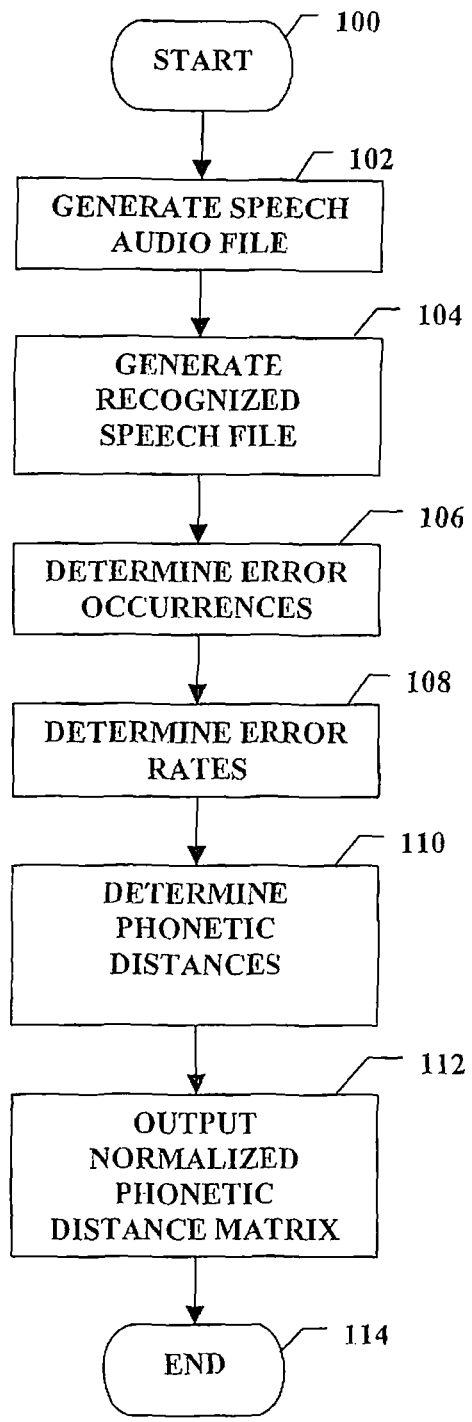
FIG. 2 is a flow diagram of a method of generating a phonetic distance matrix, according to a method aspect of the present invention.

Referring to FIG. 1, according to an embodiment of the present invention, a phonetic distance measurement system 10 includes at least one recognized speech file 12, at least one reference file 14, a comparison module 16, an error rate module 18, and a measurement module 20. The systems and methods herein are realized by at least one processor executing machine-readable code. Inputs to and outputs of the system or method are stored, at least temporarily, in some form of machine-readable memory. However, the present invention is not necessarily limited to particular processor types, numbers or designs, to particular code formats or languages, or to particular hardware or software memory media.

The recognized speech file 12 is generated using a speech recognition engine to process a speech audio file. The results of this processing are also referred to as a hypothesis. The reference file 14 contains the actual material spoken when recording the speech audio file and is used to identify errors in the recognized speech file 12.

In general, recognition errors will fall into three categories: substitution errors, insertion errors and deletion errors. A substitution error occurs when a phonetic element is incorrectly recognized as another phonetic element. Although the operations of a speech recognition engine underlying the occurrence of insertion and deletion errors is more complex, an insertion error can be said to occur where there is a phonetic element in the hypothesis where there should not be any phonetic element. A deletion error can be said to occur where the hypothesis is missing a phonetic element where a phonetic element ought to be.

The comparison module 16 is configured to compare the recognized speech file 12 and the reference file 14 to identify recognition errors. For each phonetic element, the comparison module 16 identifies all occurrences of substitution errors, insertion errors and deletion errors. For each phonetic element, the comparison module 16 further identifies how many times each other phonetic element was erroneously substituted.

The recognized speech file 12 and reference file 14 can, themselves, include the phonetic elements for which the phonetic distance is to be determined. Alternately, the phonetic elements can be derived from the recognized speech file 12 and/or the reference file 14 using a dictionary 22. For instance, where the phonetic distance between phonemes is to be determined and the recognized speech and reference files 12, 14 consist of words, the comparison module 16 can determine the phonemes using the dictionary 22 listing the phonemes which comprise each word. It will be appreciated that the present invention is not necessarily limited to any particular language or phonetic elements thereof.

In Tables 1-3, a fictitious phonetic element set has five phonetic elements (1-5) of the same type, such as phonemes, sub-phonemes or words. The data in the following tables is used for illustrative purposes only, and is not intended to reflect any actual phonetic element set or experimental data. In Table 1, the error occurrences for each phonetic element pair$_{i,j}$ are shown, including substitution, insertion and deletion error occurrences, as determined by the comparison module 16. The total reference occurrences of each phonetic element, and the total reference occurrence of all phonetic elements, tabulated from the reference file, are also shown.

Each of the Error Occurrences$_{i,j}$ represents the number of times the phonetic element i is erroneously replaced by the phonetic element j. For example, Error Occurrences$_{1,2}$ is the number of times phonetic element 2 is erroneously substituted for phonetic element 1.

For analytical purposes, insertion and deletion errors can be considered as special types of substitution errors. An insertion error can be considered as the substitution of an actual phonetic element (any of the phonetic elements 1-5, in the current example) for a non-existent or "empty" phonetic element. Likewise, a deletion error can be considered as the substitution of the empty phonetic element for an actual phonetic element.

The empty phonetic element can be considered as phonetic element "6". Accordingly, Error Occurrences$_{1,6}$ is the number of times the empty phonetic element phonetic is erroneously substituted for the phonetic element 1 (i.e., a deletion error). Similarly, Error Occurrences$_{6,1}$ is the number of times the phonetic element 1 is erroneously substituted with the empty phonetic element (i.e., an insertion error).

Alternately, insertion and deletion can be treated as special error occurrences referenced by the actual phonetic element involved. In this case, Error Occurrences$_{1,ins}$ represents the number of time phonetic element 1 is erroneously added and Error Occurrences$_{1,del}$ represents the number of times phonetic element 1 is erroneously omitted. Both treatments of insertion and deletion errors appear in the following tables.

TABLE 1

Error Occurrences

| Error Type | Substitution | | | | | Deletion | Insertion | Per Element Reference |
|---|---|---|---|---|---|---|---|---|
| i\j | 1 | 2 | 3 | 4 | 5 | "6" (del) | ins | Occurrences |
| 1 | — | 30 | 0 | 10 | 20 | 0 | 10 | 640 |
| 2 | 20 | — | 10 | 30 | 10 | 0 | 0 | 890 |
| 3 | 0 | 20 | — | 0 | 30 | 10 | 10 | 530 |
| 4 | 20 | 20 | 0 | — | 0 | 0 | 0 | 440 |
| 5 | 40 | 0 | 20 | 10 | — | 10 | 20 | 1120 |
| "6" Insertion | 10 | 0 | 10 | 0 | 20 | — | — | — |
| Total Reference Occurrences | | | | | | | | 3620 |

In the context of speech recognition engines, substitution error occurrences between any two phonetic elements can be asymmetrical. The term "phonetic element pair" as used herein is direction dependent, unless otherwise indicated. For instance, the characteristics of the phonetic element pair$_{1,2}$ can be distinct from those of the phonetic element pair$_{2,1}$. This phenomenon can be seen in Table 1, for example, where phonetic element 2 is substituted thirty times for phonetic element 1, but phonetic element 1 is substituted for phonetic element 2 only twenty times.

The error rate module 18 is configured to calculate a substitution error rate for each phonetic element pair, as well as insertion and deletion error rates for each phonetic element, as a function of the total number of phonetic element occurrences within the reference file 14. For example:

Error Rate$_{i,j}$=(Error Occurrences$_{i,j}$)/(Total Reference Occurrences).

In Table 2, error rates are shown based on the number of errors and occurrences in Table 1.

TABLE 2

Error Rates

| Error Type | Substitution | | | | | Deletion | Insertion |
|---|---|---|---|---|---|---|---|
| i\j | 1 | 2 | 3 | 4 | 5 | "6" (del) | ins |
| 1 | — | 0.008 | 0.000 | 0.003 | 0.006 | 0.000 | 0.003 |
| 2 | 0.006 | — | 0.003 | 0.008 | 0.003 | 0.000 | 0.000 |
| 3 | 0.000 | 0.006 | — | 0.000 | 0.008 | 0.003 | 0.003 |
| 4 | 0.006 | 0.006 | 0.000 | — | 0.000 | 0.000 | 0.000 |
| 5 | 0.011 | 0.000 | 0.006 | 0.003 | — | 0.003 | 0.006 |
| "6" Insertion | 0.003 | 0.000 | 0.003 | 0.000 | 0.006 | — | — |

The measurement module 20 is configured to determine the phonetic distance between the phonetic element pairs as a function of the corresponding error rate:

Phonetic Distance$_{i,j}$=f(Error Rate$_{i,j}$)

To reflect that a greater phonetic distance will result in lower recognition error, the phonetic distance can be set to vary inversely with the error rate. For example:

Phonetic Distance$_{i,j}\alpha$(1/Error Rate$_{i,j}$);

Or:

Phonetic Distance$_{i,j}\alpha$(1/(Error Rate$_{i,j}^2$+Error Rate$_{i,j}$);

Or:

Phonetic Distance$_{i,j}\alpha$(1/(log(Error Rate$_{i,j}$));

Or:

Phonetic Distance$_{i,j}\alpha$(1/($e^{\text{Error Rate}_{i,j}}$)).

While the phonetic distance could be set equal to the inverse of the error rate, or some other function thereof, it is advantageous for analytical purposes to normalize the phonetic distance values. A potentially valuable way to normalize the values is to minimize the separation from an existing phonetic distance matrix; for instance, a phonetic distance matrix determined using physiological considerations and/or an earlier phonetic distance matrix determined by averaging repeated iterations of the present invention with different speakers, speech recognition engines and/or reference texts.

The separation between the earlier existing phonetic distance matrix and current phonetic distance matrices can be expressed as:

$L(\alpha_1,\alpha_2,\alpha_3)=\Sigma_{i,j}(\text{Existing Phonetic Distance}_{i,j}-\text{Current Phonetic Distance}_{i,j})^2$; where $\alpha_1,\alpha_2$ and $\alpha_3$ are normalization coefficients independent of i and j.

The value of the coefficients $\alpha_1$, $\alpha_2$ and $\alpha_3$ can be determined by minimizing the distance between the existing phonetic distance matrix and the current phonetic distance matrix, $L(\alpha_1, \alpha_2, \alpha_3)$.

The normalized current phonetic distance matrix can then calculated using following exemplary mapping function:

$$\text{Phonetic Distance}_{i,j}=\alpha_1+\alpha_2/(\text{Error Rate}_{i,j}-\alpha_3)).$$

Alternately, the phonetic distances could simply be normalized to a scale of 0-10 by the measurement module 20 so that the general magnitude of the measurements are more familiar to those familiar with the previous phonetic distance measurements based on physiological considerations. In Table 3, a phonetic distance matrix is shown based on the assumption that the maximum error rate (the Error Rate$_{5,1}$ in Table 2) corresponds to a phonetic distance of 1, while the minimum error rate (the 0.000 error rates in Table 2) corresponds to a phonetic distance of 10 with the remaining error rates falling linearly therebetween. Where i=j the phonetic distance is set to 0.

TABLE 3

Phonetic Distances

| i\j | 1 | 2 | 3 | 4 | 5 | Deletion "6" (del) | Insertion ins |
|---|---|---|---|---|---|---|---|
| 1 | 0.0 | 3.3 | 10.0 | 7.8 | 5.5 | 10.0 | 7.8 |
| 2 | 5.5 | 0.0 | 7.8 | 3.3 | 7.8 | 10.0 | 10.0 |
| 3 | 10.0 | 5.5 | 0.0 | 10.0 | 3.3 | 7.8 | 7.8 |
| 4 | 5.5 | 5.5 | 10.0 | 0.0 | 10.0 | 10.0 | 10.0 |
| 5 | 1.0 | 10.0 | 5.5 | 7.8 | 0.0 | 7.8 | 5.5 |
| "6" Insertion | 7.8 | 10.0 | 7.8 | 10.0 | 5.5 | 0.0 | — |

According to a method aspect of the present invention (beginning at block 100), a speech audio file is generated by recording a speaker reading a reference text, corresponding to the reference file (block 102). A speech recognition engine processes the speech audio file to generate the recognized speech file (block 104).

The recognized speech file is compared to the reference file to determine error occurrences (block 106). Error occurrences can include substitution errors between phonetic element pairs, as well as insertion and deletion errors for phonetic elements. Error rates are calculated for the error occurrences as a fraction of the total occurrences of the corresponding phonetic elements in the reference file (block 108).

Phonetic distances are determined as a function of the error rates; preferably, as inversely proportional to the error rates (block 110). The phonetic distances are normalized as desired and a phonetic distance matrix is outputted (block 112). The method ends at block 114.

In the above example, the phonetic distance matrix is generated based on a recognized speech file from a single speech recognition engine generated by a single speaker. It will be appreciated that a plurality of recognized speech files from a plurality of speakers and/or speech recognition engines can be utilized to generate a phonetic distance matrix that is less dependent on a particular speaker and/or speech recognition engine. A speech recognition independent phonetic distance matrix can be generated as a zero-order approximation from a speech recognition engine dependent phonetic matrix.

The system and method of the present invention advantageously provide an empirical method for measuring phonetic distances. Unlike the earlier, physiological approach, the phonetic distances measured by the present invention can take into account the practical dependency of phonetic distance upon particular speech recognition engines, as well as upon particular speakers. Additionally, the present invention can also take into account insertion and deletion errors, which the physiological approach to phonetic distance could not directly address.

It will appreciated that the ability of the present invention to take into consideration the performance of a particular speech recognition engine significantly improves the usefulness of the phonetic distance matrix in grammar selection for the speech recognition engine. As used herein, grammar selection for a speech recognition engine can refer to selections pertaining to a general grammar for a speech recognition engine, as well as to selections pertaining to specialized grammars of one or more specific speech recognition application systems using a speech recognition engine.

Additionally, the ability of the present invention to take into account the speaker dependency of the phonetic distance matrix allows the phonetic distance matrix to be used as a valuable language training and evaluation tool. For example, according to a further aspect of the present invention, a particular speaker reads the reference text and the speech audio file is recorded. A speaker-dependent phonetic distance matrix is generated as described above. This speaker-dependent phonetic distance matrix is compared to a reference phonetic distance matrix, for instance, a phonetic distance matrix corresponding to ideal pronunciation. An evaluation module compares the speaker-dependent and reference phonetic distance matrices and outputs a comparison matrix with the speaker-dependent phonetic distances as a function of the reference phonetic distances. The speaker can thereby readily identify phonetic elements for which pronunciation requires the most improvement. Alternately, these phonetic elements can be automatically identified for the speaker.

Moreover, the speaker-dependent phonetic distance and/or comparison matrices can be compared with earlier matrices generated for the same speaker. Thus, the speaker can readily see improvement or degradation made over time, both with regard to specific phonemes and in general.

The present invention can also allow optimization of a grammar for distinct groups of speakers. For example, a specialized phonetic distance matrix can be developed using audio files of speakers representative of a particular accent (e.g., Boston-English or Korean-English) or other unique characteristics. This specialized phonetic distance matrix can then be used in grammar selection to increase recognition accuracy for the group.

It will be appreciated that the error rates determined by the present invention, or some other function of the error rate other than or in addition to a phonetic distance, can also be used to facilitate grammar selection and language training and evaluation, as well as other applications. For instance, an error rate matrix for a particular speech recognition engine, such as in Table 2, can be used in grammar selection. Likewise, an error rate matrix for a particular individual, preferably compared to optimal error rates, can be used in language training and evaluation.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A method of generating a phonetic distance matrix comprising:
   determining, for each of a plurality of phonemes occurring in the reference file, a plurality of phoneme error occurrences by comparing a recognized speech file with a reference file, the recognized speech file generated by processing at least one audio file of recorded speech with a speech recognition engine, the reference file representing the actual contents of the recorded speech;
   determining, for each of the plurality of phonemes occurring in the reference file, a plurality of phoneme error rates corresponding to the plurality of phoneme error occurrences;
   generating a plurality of phonetic distances as a function of the plurality of phoneme error rates, the plurality of phonetic distances being inversely proportional to the plurality of phoneme error rates; and
   outputting a phonetic distance matrix based on the generated plurality of phonetic distances, the phonetic distance matrix including generated phonetic distances between each of the plurality of phonemes;
   wherein generating the plurality of phonetic distances and outputting the phonetic distance matrix includes normalizing the generated phonetic distances to minimize a total separation between the outputted phonetic distance matrix and an existing phonetic distance matrix not generated based on the recognized speech file.

2. The method of claim 1, wherein the plurality of phoneme error occurrences includes a plurality of phoneme substitution, insertion and deletion error occurrences, the plurality of phoneme error rates includes a corresponding plurality of phoneme substitution, insertion and deletion error rates, and the generated plurality of phonetic distances further includes phonetic distances between each of the plurality of phonemes and insertion and deletion.

3. The method of claim 1, wherein determining the plurality of phoneme error rates includes dividing the plurality of error phoneme error occurrences by a total number phoneme occurrences in the reference file.

4. The method of claim 1, wherein normalizing the phonetic distances to minimize the total separation between the phonetic distance matrix and an existing phonetic distance matrix includes using a mapping function with three normalization coefficients.

5. The method of claim 4, wherein the mapping function is:

$$\text{Phonetic Distance}_{i,j} = \alpha_1 + (\alpha_2/(\text{Error Rate}_{i,j} - \alpha_3));$$

wherein i and j are indices of the phonemes, and $\alpha_1$, $\alpha_2$ and $\alpha_3$ are the three normalization coefficients.

6. The method of claim 5, wherein the separation between the phonetic distance matrix and the existing phonetic distance matrix is defined as:

$$L(\alpha_1, \alpha_2, \alpha_3) = \Sigma_{i,j}(\text{Existing Phonetic Distance}_{i,j} - \text{Phonetic Distance}_{i,j})^2.$$

7. The method of claim 1, further comprising generating the recognized speech file by processing, with a speech recognition engine, an audio file of a speaker reading contents of the reference file.

8. The method of claim 7, further comprising generating the audio file.

9. The method of claim 1, wherein determining a plurality of phoneme error occurrences includes comparing a plurality of recognized speech and reference files.

10. The method of claim 9, wherein the plurality of recognized speech files correspond to audio files of a plurality of different speakers.

11. The method of claim 9, wherein the plurality of recognized speech files are generated by a plurality of different speech recognition engines.

12. A phonetic distance measurement system comprising:
   a reference file;
   a recognized speech file generated by processing an audio file of a speaker reading contents of the reference file;
   a comparison module configured to determine, for each of a plurality of phonemes occurring in the reference file, a plurality of phoneme error occurrences by comparing the recognized speech file and the reference file;
   an error rate module configured to determine, for each of the plurality of phonemes, a plurality of phoneme error rates corresponding to the plurality of phoneme error occurrences; and
   a measurement module configured to generate a plurality of phonetic distances between each of the plurality of phonemes as a function of the plurality of phoneme error rates, the plurality of phonetic distances being inversely proportional to the plurality of phoneme error rates;
   wherein the measurement module is further configured to normalize the phonetic distances to an existing matrix of phonetic distances not generated based on the recognized speech file.

13. The system of claim 12, further comprising a dictionary, wherein the comparison module is further configured to access the dictionary to identify phonemes in the reference file and recognized speech file prior to determining the plurality of phoneme error occurrences.

14. The system of claim 12, wherein the plurality of phoneme error occurrences the comparison module is configured to determine include phoneme substitution error occurrences, phoneme insertion error occurrences and phoneme deletion error occurrences.

15. The system of claim 14, wherein the comparison module is further configured to identify the plurality of phoneme substitution error occurrences by corresponding pairs of phonemes and the phoneme insertion and deletion error occurrences by individual corresponding phonemes.

* * * * *